United States Patent [19]

Bhadra

[11] Patent Number: 5,141,647
[45] Date of Patent: Aug. 25, 1992

[54] CONTROL OF ODOR AND SEPTICITY OF SEWAGE

[76] Inventor: Amal K. Bhadra, P.O. Box 91, Greenbelt, Md. 20768-0091

[21] Appl. No.: 813,840

[22] Filed: Dec. 27, 1991

[51] Int. Cl.$^5$ .............................................. C02F 1/58
[52] U.S. Cl. ................... 210/620; 210/631; 210/763; 210/916
[58] Field of Search ............... 210/620, 631, 721, 758, 210/763, 916

[56] References Cited

U.S. PATENT DOCUMENTS

| | | |
|---|---|---|
| 653,741 | 7/1900 | Jewell. |
| 1,359,086 | 11/1920 | MacLachlan. |
| 1,511,418 | 10/1924 | MacLachlan. |
| 1,543,939 | 6/1925 | MacLachlan. |
| 2,171,203 | 8/1939 | Urbain et al. ............... 210/2 |
| 2,877,177 | 3/1959 | Story ............... 210/49 |
| 3,411,875 | 11/1968 | Yoshikawa et al. ............... 23/116 |
| 3,522,173 | 7/1970 | Lindman et al. ............... 210/49 |
| 3,634,232 | 1/1972 | Dunlop ............... 210/63 |
| 3,829,379 | 8/1974 | Ishida et al. ............... 210/631 |
| 3,948,774 | 4/1976 | Lindman ............... 210/192 |
| 3,962,073 | 6/1976 | Yoshikawa et al. ............... 210/7 |
| 3,963,611 | 6/1976 | Dardenne-Ankringa, Jr. .... 210/758 |
| 3,966,450 | 6/1976 | O'Neill et al. ............... 210/916 |
| 4,123,355 | 10/1978 | Frosch et al. ............... 210/50 |
| 4,200,523 | 4/1980 | Balmat ............... 210/631 |
| 4,304,673 | 12/1981 | Reynolds et al. ............... 210/721 |
| 4,340,489 | 7/1982 | Adams et al. ............... 210/718 |
| 4,412,981 | 11/1983 | Kubicek ............... 210/758 |
| 4,537,686 | 8/1985 | Borbely et al. ............... 210/713 |
| 4,541,986 | 9/1985 | Schwab et al. ............... 210/916 |
| 4,615,873 | 10/1986 | Devuyst et al. ............... 423/367 |
| 4,622,149 | 11/1986 | Devuyst et al. ............... 210/717 |
| 4,654,144 | 3/1987 | Sharkey et al. ............... 210/631 |
| 4,874,530 | 10/1989 | Kobayashi et al. ............... 210/763 |
| 4,880,542 | 11/1989 | Sublette ............... 210/631 |
| 4,925,569 | 5/1990 | Chou et al. ............... 210/721 |

OTHER PUBLICATIONS

Leck, C. and Bagender, L. E. Analy. Chem. 1988, pp. 1680-1683, vol. 60.
Kotronarou et al., Research Journal, Wat. Pollution Control Federation, Nov. 1991, vol. 63, pp. 965-970.
Bhadra, A. K. Oxygen and Sulfur in Bacterial Cell Synthesis. Water Environment & Technology, Dec. 1991, pp. 55-59.

*Primary Examiner*—Thomas Wyse
*Attorney, Agent, or Firm*—William S. Ramsey

[57] ABSTRACT

This invention is a process for controlling odor and septicity of sewage. A sulfur dioxide species is added to the sewage among with metal ion catalyst and the sewage is aerated. The effect of this treatment is to reduce the generation of hydrogen sulfide and the odor and corrosion associated with this compound and to reduce the need for aeration in the treatment of sewage. This results in substantial savings in aeration costs.

11 Claims, No Drawings

CONTROL OF ODOR AND SEPTICITY OF SEWAGE

BACKGROUND OF THE INVENTION

1. Field of the Invention

This invention relates to a process for the elimination of sewage odor by adding a solution of sulfur dioxide in sodium hydroxide, or a solution of sulfite, bisulfite, metabisulfite, sulfurous acid, or sulfur dioxide to sewage, sewage conduit, and sewage systems in the presence of metal catalysts. The invention also prevents further formation of odoriferous compounds in sewage, and sulfide-induced corrosion.

The invention is particularly addressed to the problem of recovering sewage from its septicity. This invention is also directed to the initiation and promotion of biosynthesis by uptake of oxygen, and purification of sewage and wastewater by increasing the efficiency of the biological process.

2. Description of the Prior Art

The characteristic of sewage is its highly disagreeable odor. Many organic and inorganic compounds contribute to the formation of sewage odor. Mostly inorganic and organic sulfur compounds are held responsible for the odor. The principal among the sulfur compounds is hydrogen sulfide. It is also easy to detect. When almost no hydrogen sulfide formation takes place in sewage, it is considered odorless. Therefore, hydrogen sulfide is taken as a representative of odor forming compounds. Hydrogen sulfide in sewage creates a public nuisance because of its highly disagreeable odor at levels as low as 0.01 parts per million (PPM) in the atmosphere. Breathing by humans of air containing as low as 10 PPM of hydrogen sulfide for a period of time can prove fatal. Fatal accumulations are likely to occur in covered or domed clarifiers or settling takes in treatment plants, or in manholes or wet wells in sewerage systems.

Besides odor, hydrogen sulfide formation results in heavy corrosion of metal and concrete sewer lines, concrete and metal structures, and metal equipment and machinery. The corrosion is greatly reduced when the formation of hydrogen sulfide can be reduced in sewage. So far as it is known, the presence of hydrogen sulfide is also detrimental to the growth of the microorganisms.

Hydrogen sulfide is not easily oxidized. It can exist in aqueous solutions supersaturated with oxygen. The occurrence of hydrogen sulfide in the Baltic Sea, the North Sea, and the Atlantic Ocean supersaturated with oxygen has been reported (Leck, C. and Bagender, L. E., Anal. Chem., 1988, 1680–1683). Although hydrogen sulfide is almost always formed in sewage, sewage conduit, and sewage systems, the rate of formation is greatly enhanced by summer temperature and prolonged anaerobic conditions.

The conditions under which hydrogen sulfide is formed in sewage are called septic. In fact, the microorganisms present in sewage turn black and seem lifeless or in serious metabolic disorder in septic sewage. Until this condition is reversed, sewage can not be efficiently purified by biological process.

Although many treatments to control formation and regeneration of sewage hydrogen sulfide have been tried, none has been uniformly satisfactory or successful in both gravity and force main systems. Among those treatments used have been aeration, chlorination, ozonation, lime, sodium nitrate, activated carbon filtration, odor masking, hydrogen peroxide oxidation, and iron salts.

Ferric chloride is widely used to control odor as well for separation of phosphate in many treatment plants with moderate success. Many treatment plants in Europe and some in America have started to treat sewage with pure oxygen. By treating with pure oxygen, the problem of odor, corrosion, and septicity have largely been overcome. The use of pure oxygen for controlling odor and as a source of molecular oxygen for the activated sludge reactors is the best known process for purifying sewage. But this is not a very satisfactory process. One plant in Chicago which injects in the force pure oxygen to control hydrogen sulfide has to add hydrogen peroxide in summer months in addition to pure oxygen to control hydrogen sulfide.

Pure oxygen is also expensive. It is not a cost-effective process for small plants. Many treatment plants in America are trying to explore some other alternative methods.

To evaluate the possibility of inventing an alternative method for controlling sewage odor, a literature search was conducted. Several patents were discovered which used sulfur compounds for purification of sewage and wastewater in the presence of iron and other metals preferably at a low pH. All the patents discuss methods for purification of water by chemical oxidation. No attempts have been made to purify sewage or wastewater by improving biological process by taking advantage of oxidative power that is generated in the presence of a metal catalyst and oxygen. None of these methods has been commercially accepted.

One example is U.S. Pat. No. 653,741, issued to Jewell in 1900, which involves the use of sulfurous acid solution and scrap iron to produce a reactant solution that is mixed with water to be treated in a liquid process. U.S. Pat. No. 2,171,203 to Urbain et al. teaches purification of organically polluted water such as sewage by generating $Fe_2(SO_4)_3$ in situ by passing sulfur dioxide in sewage in the presence of iron. Additionally, U.S. Pat. No. 3,522,173 to Lindman et al. teaches the treatment of wastewater by the use of sulfur dioxide as an acidifying agent and iron as a flocculating agent to purify the wastewater. However, the Lindman et al. process requires mixing the sulfur dioxide gas stream with large amounts of oxygen or oxygen-containing gases for the method to be effective. U.S. Pat. No. 3,948,774 issued Apr. 6, 1976 involves purification of water by treating wastewater with sulfur dioxide and iron between pH 2.4 and 2.6. Further, the use of sulfur dioxide for purification of wastewater is described in U.S. Pat. No. 4,123,355. In the process, sufficient sulfur dioxide is used to reduce the pH of the wastewater, generally to the order of pH 2 to 3.

Two patents to MacLachlan, U.S. Pat. Nos. 1,511,418 and 1,543,939, each discuss the treatment of sewage sludge with sulfur dioxide gas. However, the patents make no mention of the process as being applicable to water treatment, and neither patent discusses the use of the method for water purification purposes.

Sulfur dioxide is also used as disinfectant. U.S. Pat. Nos. 4,304,673 and 4,340,489 discuss processes by which wastewater is continuously disinfected by combining the wastewater with sufficient sulfur dioxide so that the wastewater has a selected free sulfur dioxide content of at least 5 mg/liter.

Cyanide can be almost completely oxidized by taking advantage of the oxidative power generated by sulfur dioxide oxidation. U.S. Pat. Nos. 4,537,686; 4,615,873, and 4,622,149 claim that the cyanide content of industrial wastewater containing the same is removed by treatment with sulfur dioxide or an alkali or alkaline earth metal sulfite or bisulfite in the presence of excess oxygen and a metal catalyst, preferably copper.

U.S. Pat. No. 2,877,177 issued Mar. 10, 1959 discusses a process of treating sulfur dioxide waste liquors containing alkali metal sulfides which are highly colored and odoriferous with sulfurous acid and thereby converting them into colorless and odorless liquids.

In all the patents it appears that the oxidation of sulfur dioxide generates oxidizing power. Thus water has been purified by oxidizing sewage and wastewater chemically. But no attempts have been made to purify sewage and wastewater by biological process after modifying and improving the condition of sewage with sulfite or sulfur dioxide addition.

Recently, it has been claimed by Kotronarou et al. in an article in Research Journal, Water Pollution Control Federation, Nov. 1991, that peroxymonosulfate is a more rapid and efficient oxidant of hydrogen sulfide and as a viable alternative to hydrogen peroxide for the control of sulfide-induced corrosion in concrete sewers.

In order to understand the condition of sewage when it is confined in sewage conduit for a long time in the absence of oxygen and at high temperatures, a study was made in the laboratory with sulfites and activated sludge. During the course of the study, sulfite, bisulfite, metabisulfite, as solution or sulfur dioxide in sodium hydroxide, and sulfurous acid were added together with metal salts to odoriferous black septic activated sludge. The black color of the activated sludge gradually turned gray and odor was greatly reduced. The gray activated sludge turned black again when it was allowed to sit in the laboratory in the absence of oxygen and gradually it became an increasing source of odor formation. However, on addition of sulfite and iron salts, the black sludge again regained their gray healthy look and odor also was reduced. Thus it appeared that sulfite could prevent activated sludge from being septic and was essential for the metabolism of the activated sludge.

It is also believed that sulfur in the form of sulfite enters in biological reaction. Thus it appeared that sulfite has a great potential in controlling sewage odor, recovering sewage from septicity increasing oxygen uptake in sewage, and promoting microbial metabolism, but sulfur dioxide or sulfite had never been used as such. The problem of controlling sewage odor and purification of sewage in a cost-effective way by improving biological process basically has not been solved.

It is, therefore, an object of the present invention to provide a process for the elimination of odor in sewage, sewage conduit, and sewage systems by aerating and sulfur dioxide-sodium hydroxide treatment in the presence of metal catalysts Instead of sulfur dioxide-sodium hydroxide, sulfite, bisulfite, meta or pyrosulfite, sulfur dioxide and a solution of sulfur dioxide in water can be used. Metal salts such as iron, copper, nickel, manganese, chromium, titanium, vanadium, and other metals and compounds such as zinc, platinum peroxydisulfate and the like which promote oxidation of sulfur dioxide or sulfite may be used.

It is a particular object of the present invention to provide a process for the recovery of sewage from septicity, increase uptake rate of oxygen in sewage, and initiate and promote microbial metabolism in sewage. It is also an object of the present invention to utilize oxygen injected in sewage and activated sludge reactors as fully as possible by increasing oxygen absorbing capacity of sewage and of the activated sludge and thereby reducing the cost of operation.

It is also an object of the invention to provide a process by which sulfide-induced corrosion of sewage treatment plants can be overcome.

SUMMARY OF THE INVENTION

The objects of the present invention are provided by a simple process for the utilization of oxidizing and reducing power generated by sulfite oxidation. The process comprises aerating sewage with an oxygen containing gas and treating the sewage, sewage conduit, and sewage systems with sulfur dioxide-sodium hydroxide solution in the presence of metal catalysts. The oxidative power generated by sulfation will eliminate sewage odor by oxidizing hydrogen sulfide and other odoriferous compounds and take part in microbial metabolism. The reducing power will initiate and promote biosynthesis.

As an alternative to sulfur dioxide-sodium hydroxide solution, a solution of sulfite bisulfite, meta or pyrosulfite, sulfur dioxide gas in water, or gaseous sulfur dioxide may be used.

As a catalyst, metal salts of iron, copper, cobalt, nickel, chromium, manganese, titanium, and vanadium can be used.

The pH of sewage may be raised if necessary by adding alkali such as lime, soda ash, sodium bicarbonate, and sodium hydroxide.

The present invention is an improvement over known processes for treating and purifying raw sewage simultaneously by chemical and biological processes. The improvement comprises establishing conditions in sewage, sewage conduit, and sewage systems in which oxygen is easily absorbed and utilized for microbial metabolism.

The special advantage of this process is that it is easy to practice and can be practiced in small as well as in large plants. The added advantage for plants which dispose sludge by incineration is that sulfur dioxide can be recovered from incinerators and used by absorbing in sodium hydroxide or water or gaseous or liquid form. The hidden advantage of this process is that sulfide-induced corrosion will be greatly reduced.

The invention will also provide a process which will readily utilize the oxygen supplied to sewage and to activated sludge reactors in the form of any oxygen-containing gas. This process thereby prevents loss of such oxygen. This will reduce the need for aerating sewage and means a substantial savings for the treatment plants. Additional sulfur dioxide in the form of a solution of sulfur dioxide in sodium hydroxide, or in the form of sulfite, bisulfite, metabisulfite, or pyrosulfite or sulfurous acid may be added to the activated sludge reactors. Suitable metal catalysts preferably iron, copper, or manganese, and an alkali if necessary, such as lime or soda ash or sodium hydroxide may also be added.

Although the mechanism of this process is not well understood, a possible explanation of the mechanism follows. This invention may be more easily understood when reference is made to the possible mechanisms of sulfite or sulfur dioxide oxidation which involves formation of reducing and oxidizing powers and radicals and radical chain reactions into which oxygen is incorporated during the course of the The radicals and the reducing power generated in the course of the reaction may take part in synthetic and oxidizing powers in the oxidation and other metabolic functions of microbial life. The proposed mechanism of the reaction is as follows:

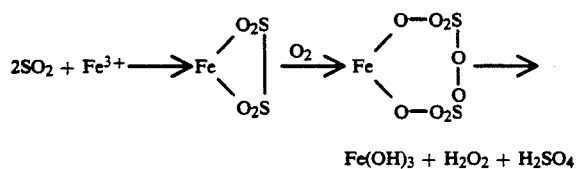

$$Fe(OH)_3 + H_2O_2 + H_2SO_4$$

The mechanism of the reaction has been discussed in further detail by the inventor in an article in Water Environment & Technology, 3(12), pages 55–59, December 1991.

DESCRIPTION OF SPECIFIC EMBODIMENTS

In practice of the process of the present invention, the septic condition of sewage will be eliminated, hydrogen sulfide and other odoriferous compounds in sewage will be controlled, the efficiency of the overall biological process will be increases, the activated sludge will form better floc, which will easily settle, and the organics and inorganics will efficiently be removed from sewage by the activated sludge. A solution of sulfur dioxide in sodium hydroxide is added to sewage which is aerated with an oxygen-containing gas in the presence of metal catalysts. This invention may be regarded as a successful practical demonstration of the importance of sulfite oxidation in the biological system.

Sulfur dioxide is the active species of sulfurous acid, sulfite, bisulfite, metabisulfite or pyrosulfite, and a solution of sulfur dioxide in sodium hydroxide. Reduction of all these compounds either forms dithionous acid or dithionite. Henceforth, "sulfur dioxide species" will be used for all the following compounds: sulfur dioxide-sodium hydroxide solution, sulfite, bisulfite, metabisulfite or pyrosulfite, sulfurous acid, and sulfur dioxide. Dithionite is a very strong absorbent of oxygen and is readily converted into peroxydisulfate by absorbing oxygen: peroxydisulfate thus formed suffers hydrolytic decomposition into sulfate and hydrogen peroxide. The oxidation of sulfur dioxide species generates a radical chain reaction catalyzed by metal ions. Oxygen is incorporated in the reaction chain and the chain reaction subsequently suffers hydrolytic fission into sulfate and hydrogen peroxide. The chain reaction provides both reducing and oxidizing power which may be used for synthesis and metabolic functions of bacterial life.

Sulfur dioxide species readily combine with many organic compounds and the microorganisms can metabolize by oxidation of these organo-sulfur compounds. Thus the oxidation of sulfite or sulfur dioxide may occur simultaneously in organic combination and in free state. It could be possible that hydrogen sulfide and other odoriferous compounds are partially oxidized chemically—by the oxidation of sulfur dioxide species without being in organic combination. But the rapid elimination of hydrogen sulfide and other odor forming compounds from septic odoriferous sewage and apparently healthy look of biomass caused by simple mixing sulfur dioxide species in the presence of metal catalyst followed by aeration for a few minutes demonstrates a vital role of sulfation in microbial metabolism.

Sulfur dioxide-sodium hydroxide solution or sulfur dioxide species may be introduced in sewerage or the treatment system where it can become thoroughly mixed with sewage in order to effect contact with the microorganisms, organic compounds that bind with sulfur dioxide species, sulfide, hydrogen sulfide, and other odoriferous compounds. This introduction may be at the beginning of gravity or force main sewerage, or at the entrance to a lift station or treatment plant, or as the sewage enters a settling tank, or at any other point at which hydrogen sulfide odors and corrosion are known to create a nuisance, and where it is therefore desired to effect sulfide and hydrogen sulfide oxidation, and at the biological reactors.

When sulfur dioxide-sodium hydroxide solution or sulfur dioxide species are added to raw sewage, some of it is likely to be carried over to the activated sludge reactors. However, some more sulfur dioxide species may be added in the biological reactors. If sulfur dioxide species are added in the form of sulfurous acid or sulfur dioxide gas to the activated sludge reactors, the pH of the reactors must be raised by adding some alkali, preferably before adding sulfurous acid or sulfur dioxide to the activated sludge reactors. Sufficient metal salts should be added, if not already present. Oxygen supplied in the form of any oxygen containing gas will be readily absorbed in the presence of sulfite species in the activated sludge reactors. This will reduce the need of aeration of activated sludge. Moreover, in the presence of sulfite species, oxygen will be efficiently utilized for synthesis and metabolic functions of the activated sludges.

The amount of sulfur dioxide species to be added may vary widely. It will depend on the amount of microorganisms present in sewage, the amount of organic compounds which bind with sulfur dioxide species, the amount of sulfides, hydrogen sulfide and other odor forming compounds, the points of application, and on the nature and amount of additives. An amount which will provide from 5 to 100 PPM of active sulfur dioxide active species by weight of aqueous medium or sewage is usually desirable. A concentration of 1 to 300 PPM may be used. Generally a concentration in excess of 300 PPM offers no advantage.

Sulfite, bisulfite, metabisulfite or pyrosulfite may be purchased from the market and added directly in the form of solid. However, it is always preferable to add it as an aqueous solution. These compounds may be used as alkali salts or in the form of any other salt. Sulfur dioxide or sulfurous acid and sodium hydroxide may also be added separately but it is not preferable.

Sulfur dioxide-sodium hydroxide solution may be made in any convenient way, such as by passing sulfur dioxide gas into a solution of sodium hydroxide, or it may be prepared by mixing a solution of sodium hydroxide with an aqueous solution of sulfur dioxide in water or with liquid sulfur dioxide. The sulfur dioxide-sodium hydroxide solution may be diluted before addition to sewage. A solution of sulfur dioxide-potassium hydroxide may also be used instead of sulfur dioxide-sodium hydroxide solution. Similarly, sulfur dioxide may be absorbed in any alkali or any alkaline hydroxide and may be used similarly. A solution of sulfur dioxide-sodium hydroxide will probably contain a mixture of compounds known as sulfite, bisulfite, and metabisulfite or pyrosulfite. Sulfur dioxide may be recovered from the incinerators or it can also be prepared by burning sulfur.

Sulfation does not take place in the absence of metal ions. The process of sulfation is always catalyzed by metal ions. Usually sewage contains various types of metal ions which could be regarded as sufficient for sulfation. The metals may not always be available for catalytic oxidation of sulfation. The metal ions may be in the form of organo-metallic complex. From experimental observations, it has been found that sulfation to some extent takes place even when no metal ions are added to sewage. Addition of metal salts considerably improves the process of sulfation.

Any type of metal salts or any metal salts which support the process of sulfation may be used. Preferably easily available and cheap salts of metals such as iron, copper, nickel, manganese, cobalt, chromium, titanium, and vanadium may be used. Other metal ions such as platinum, and osmium which support sulfation may be used but are not practical. A combination of metal salts such as iron and copper, iron and manganese, iron and vanadium, and the like may be used. The metals may be used in the form of any salts such as chloride, nitrate, nitrite, and sulfate The metals may be present in their salts in any valency state.

The amount of metal salts needed for sulfation may vary widely. This will depend on many factors, such as toxicity of the metal, and the need for the metal ions other than for catalyzing the oxidation. Iron may be used from trace amounts to 25 PPM or even more. In addition to acting as a catalyst, iron will react with phosphate and separate it from sewage by precipitation. The metals other than iron are added in trace amounts from 0.01 to 5 PPM. In wastewater treatment plants, waste iron salts such as ferric chloride and ferrous sulfate are added. These waste iron salts themselves contain a number of other metal irons. The optimum amount of iron added to domestic sewage as ferric chloride is 1 to 8 PPM iron as Fe. Other metal salts such as copper, manganese may be added together with iron from 0.1 to 1 PPM. However, cost of the chemicals plays a vital role in selection of the metal salts. Metal salts may be used in larger doses if they are not toxic and too expensive. The metal salts may be used before or after the addition of sulfur dioxide species. Metal salts and sulfur dioxide species may be mixed together before addition to sewage. In that case extra precautions must be taken to make sure that a substantial part of the sulfur dioxide species is not oxidized to sulfate before it is mixed with sewage.

Sewage may be aerated with any oxygen containing gas. Adding sulfur dioxide species and simultaneously aerating sewage may be done. Sewage may also be aerated after addition of sulfur dioxide species to sewage. However, aeration may be started before adding sulfur dioxide species to sewage. Aeration is always beneficial to sewage treatment. In most of the treatment plants aeration is done with compressed air or diffused air. Oxygen supplied in the form of atmospheric air to sewage, sewage conduit, sewage systems, and activated sludge reactors is only partially used. Nitrogen present in air at 80% acts as a purging agent and drives out a substantial part of oxygen supplied to sewage. To overcome this problem, many wastewater treatment plants use pure oxygen or air rich in oxygen. This problem will be considerably reduced when sulfur dioxide species and metal salts are added to sewage followed by aeration. Some of the sulfur dioxide species added to sewage may bind with organic compounds and others will not bind. Both free and organically bound sulfur dioxide species in the presence of a catalyst will form a radical chair reaction. Oxygen will be rapidly absorbed in sewage, or in activated sludge reactors in any form it is supplied or is available. Thus sulfur dioxide species present in sewage and in activated sludge reactors will save a substantial amount of oxygen from being wasted. This will reduce the need for aeration of sewage and activated sludge. This will cut the cost of aeration considerably. Each wastewater plant must spend about 35 to 40 percent of its total budget for aeration.

Furthermore, aeration of sewage and activated sludge reactors in the presence of sulfur dioxide species will also purify sewage and wastewater much more efficiently. In fact, sulfur dioxide species and sulfation initiates and promotes microbial synthesis and metabolism in sewage treatment plants.

Additionally, addition of sulfur dioxide-sodium hydroxide solution to sewage will raise the pH of sewage. In colder months, the pH of domestic sewage registers a value around 7. But in summer months when the formation of hydrogen sulfide starts increasing, the pH of sewage drops as a level between 6.2 and 6.6. Thus addition of sulfur dioxide-sodium hydroxide solution to sewage will reduce the need to add lime to sewage in order to raise its pH. This will reduce the total volume of sludge. The sludge thus produced can be easily incinerated. If the sludge in not incinerated, the cost of transportation will be reduced. This will mean a substantial saving for the treatment plants which use lime to raise the pH of sewage, because the sludge of many such plants may contain about 40% lime.

Although the pH of sewage usually lies between 6 and 8, sometimes it may vary widely. The catalytic oxidation sulfur dioxide species can be carried out between pH 2 and 12. But it is not preferred to lower the pH of sewage below 6. At low pH some microorganisms can not properly function. The pH of sewage may be adjusted with any alkali and acid. Most of the metal salts added to sewage are of industrial origin. Those metal salts may be used as a source of metal and acid. In domestic sewage, the main problem is to raise the pH because the pH of sewage goes down when sewage is treated with acidic solution of metals. Most wastewater plants add acid to sewage in the form of metallic salt solutions and again neutralize the acidity with lime. The optimum pH range of the activated sludge reactors is between 7 and 9 and of sewage before the biological process between 6.5 and 8.

Sulfur dioxide species may be added combined with aeration in the sewage conduit or in the pumping stations with or without metal salts and alkali. If the treatment of sewage starts in the treatment plants, then sulfur dioxide species should be added as soon as possible combined with aeration with metal salts. If necessary an alkali such as lime or soda ash or sodium hydroxide may be added simultaneously or afterwards in the grit chambers, or the primary reactors or the biological reactors. However, the addition of sulfur dioxide species in the form of sulfur dioxide-sodium hydroxide solution will in most cases eliminate the need for further addition of any alkali in sewage.

After addition of sulfur dioxide species with metal salts to raw sewage, sewage must be aerated for a period ranging from 5 to 30 minutes or more. Aeration for longer periods is always beneficial. In subsequent operation of the plant, the need for aerating sewage will be reduced because sulfite added will enter into biological reactions. Sulfation is one of the principal pathways through which oxygen works in different functions of microbial life.

In order to more fully illustrate the nature of the invention and the manner of practicing the same, the following Examples are presented:

EXAMPLE 1

About 1 liter of raw sewage which contained about 1 PPM hydrogen sulfide was transferred into a glass container. An aliquot of 1.0 ml of an aqueous solution of sulfurous acid containing 100,000 PPM sulfur dioxide was mixed with 2 ml 0.1N sodium hydroxide and added to the sewage with stirring for 15 minutes. The color of the biomass present in the sewage slowly turned gray. After the sulfur dioxide-sodium hydroxide solution was added, no odor due to hydrogen sulfide could be perceived.

EXAMPLE 2

About 1 liter of raw sewage which contained about 1 PPM hydrogen sulfide was transferred into a glass container. An aliquot of 0.5 ml of an aqueous solution of sulfurous acid containing 100,000 PPM sulfur dioxide was mixed with 1 ml 0.1N sodium hydroxide and added to the sewage with stirring for 15 minutes. The color of the biomass present in the sewage slowly turned gray and the odor of sewage could no longer be perceived.

EXAMPLE 3

About 1 liter of raw sewage which contained about 1 PPM hydrogen sulfide was transferred into a glass container. An aliquot of 0.25 ml of an aqueous solution of sulfurous acid containing 100,000 PPM sulfur dioxide was mixed with 0.5 ml 0.1N sodium hydroxide and added to the sewage with stirring for 15 minutes. The treated sewage did not give any odor of hydrogen sulfide.

EXAMPLE 4

About 1 liter of raw sewage which contained about 1 PPM hydrogen sulfide was transferred into a glass container. An aliquot of 1.0 ml of an aqueous solution of sulfurous acid containing 5,000 PPM sulfur dioxide was mixed with 0.5 ml 0.1N sodium hydroxide and added to the sewage with stirring for 15 minutes. The biomass present in sewage turned gray but a little odor of hydrogen sulfide could be perceived in sewage.

EXAMPLE 5

One liter of fresh sewage is transferred into a 2 liter beaker. An aliquot of 0.1 ml of an aqueous solution of sulfurous acid containing 100,000 PPM sulfur dioxide is mixed with 1.0 ml 0.1N sodium hydroxide and added to the sewage with stirring for. An aliquot of 0.2 ml aqueous solution of copper sulfate which contains 1 mg/ml copper is added to sewage with stirring and aerated for 5 minutes. After aeration, an aliquot of 500 ml is transferred into a standard joint wash bottle. Unreacted hydrogen sulfide in sewage is purged with pure nitrogen gas. The purged hydrogen sulfide is trapped in a solution of 2% zinc acetate. Purging is done for 1 hour. After 1 hour, the trapped hydrogen sulfide is analyzed by the standard molybdenum blue method.

About 95% of the 0.5 PPM hydrogen sulfide of the raw sewage is reduced by this process.

EXAMPLE 6

One liter of fresh sewage is transferred into a 2 liter beaker. An aliquot of 0.8 ml of an aqueous solution of sulfurous acid containing 10,000 PPM sulfur dioxide is mixed with 1.0 ml 0.1N sodium hydroxide and added to the sewage with stirring for. An aliquot of aqueous solution of ferric chloride which contains 2 mg iron is added to sewage with stirring and aerated for 5 minutes. After aeration, an aliquot of 500 ml is transferred into a standard joint wash bottle. Unreacted hydrogen sulfide in sewage is purged with pure nitrogen gas. The purged hydrogen sulfide is trapped in a solution of 2% zinc acetate. Purging is done for 1 hour. After 1 hour, the trapped hydrogen sulfide is analyzed by the standard molybdenum blue method.

About 90% of the 0.3 PPM hydrogen sulfide of the raw sewage is reduced by this process.

EXAMPLE 7

One liter of fresh sewage is transferred into a 2 liter beaker. An aliquot of 0.2 ml of an aqueous solution of sulfurous acid containing 10,000 PPM sulfur dioxide is mixed with 1.0 ml 0.1N sodium hydroxide and added to the sewage with stirring for. An aliquot of aqueous solution of waste ferric chloride which contains 2 mg iron is added to sewage with stirring and aerated for 5 minutes and allowed to sit for 30 minutes. After sitting, an aliquot of 500 ml is transferred into a standard joint wash bottle. Unreacted hydrogen sulfide in sewage is purged with pure nitrogen gas. The purged hydrogen sulfide is trapped in a solution of 2% zinc acetate. Purging is done for 1 hour. After 1 hour, the trapped hydrogen sulfide is analyzed by the standard molybdenum blue method.

About 90% of the 0.2 PPM hydrogen sulfide of the raw sewage is reduced by this process.

EXAMPLE 8

One liter of fresh sewage is transferred into a 2 liter beaker. An aliquot of 2.5 ml of an aqueous solution of sulfurous acid containing 10,000 PPM sulfur dioxide was mixed with 1.0 ml 0.1N sodium hydroxide and added to the sewage with stirring for. An aliquot of aqueous solution of waste ferric chloride which contains 3 mg iron is added to sewage with stirring and aerated for 5 minutes and allowed to sit for 30 minutes. After sitting, an aliquot of 500 ml is transferred into a standard joint wash bottle. Unreacted hydrogen sulfide in sewage is purged with pure nitrogen gas. The purged hydrogen sulfide is trapped in a solution of 2% zinc acetate. Purging is done for 1 hour. After 1 hour, the trapped hydrogen sulfide is analyzed by the standard molybdenum blue method.

All of the 2 PPM hydrogen sulfide of the raw sewage is reduced by this process.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of the disclosure, otherwise than as specifically described and exemplified herein.

I claim:

1. The process of treating sewage for control of odor and septicity comprising the steps:
    adding source of sulfur dioxide selected from the group consisting of sulfur dioxide, sulfite, bisulfite, metasulfite, pyrosulfite, and sulfurous acid dissolved in an alkaline aqueous solution,
    adding a metal salt catalyst, and
    aerating the sewage.

2. The process of claim 1 wherein the alkaline aqueous solution is a solution of sodium hydroxide.

3. The process of claim 1 wherein the alkaline aqueous solution is a solution of about 0.1N sodium hydroxide.

4. The process of claim 1 wherein the source of sulfur dioxide solution provides sulfur dioxide at a concentration of 1 to 300 PPM.

5. The process of claim 1 wherein the source of sulfur dioxide is sulfurous acid dissolved in aqueous sodium hydroxide solution.

6. The process of claim 1 wherein the metal salt catalyst is selected from the group consisting of salts of iron, copper, cobalt, nickel, chromium, manganese, titanium, and vanadium.

7. The process of claim 1 wherein the metal salt catalyst is at a concentration of 0.01 to 25 PPM metal.

8. The process of claim 1 wherein the metal salt catalyst is ferric chloride at a concentration of 0.01 to 25 PPM iron.

9. The process of claim 1 wherein the metal salt catalyst is ferric chloride at a concentration of 1 to 8 PPM iron.

10. The process of claim 1 wherein the metal salt catalyst is ferric sulfate at a concentration of 0.01 to 25 PPM iron.

11. The process of claim 1 wherein the metal salt catalyst is ferric sulfate at a concentration of 1 to 8 PPM iron.

* * * * *